US012288528B2

(12) United States Patent
Han et al.

(10) Patent No.: US 12,288,528 B2
(45) **Date of Patent: *Apr. 29, 2025**

(54) DISPLAY DEVICE

(71) Applicant: LG Display Co., Ltd., Seoul (KR)

(72) Inventors: Sangyun Han, Paju-si (KR); Yeongseok Choe, Seongnam-si (KR); Joonmo Yang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,634

(22) Filed: Feb. 8, 2024

(65) Prior Publication Data

US 2024/0185802 A1 Jun. 6, 2024

Related U.S. Application Data

(63) Continuation of application No. 17/895,927, filed on Aug. 25, 2022, now Pat. No. 11,942,042, which is a (Continued)

(30) Foreign Application Priority Data

Dec. 31, 2019 (KR) ........................ 10-2019-0179404

(51) Int. Cl.
*G09G 3/32* (2016.01)
*G09G 3/3275* (2016.01)

(52) U.S. Cl.
CPC ... *G09G 3/3275* (2013.01); *G09G 2300/0452* (2013.01); *G09G 2320/0276* (2013.01); *G09G 2320/0673* (2013.01)

(58) Field of Classification Search
CPC ......... G09G 3/3275; G09G 2300/0452; G09G 2320/0276; G09G 2320/0673; G09G 5/02;

(Continued)

(56) References Cited

U.S. PATENT DOCUMENTS 7,015,903 B2 3/2006 Lee
9,530,368 B2 12/2016 Lee et al.
(Continued)

FOREIGN PATENT DOCUMENTS

CN 1713254 A 12/2005
CN 104658496 A 5/2015
(Continued)

OTHER PUBLICATIONS

China National Intellectual Property Administration, Office Action, Chinese Patent Application No. 202011606329.4, Dec. 14, 2023, 15 pages.

(Continued)

*Primary Examiner* — Michael A Faragalla
(74) *Attorney, Agent, or Firm* — Fenwick & West LLP

(57) ABSTRACT

A display device includes a display panel having a plurality of sub-pixels to display an image; a data driver for supplying image data to the plurality of sub-pixels; a gate driver for supplying a gate signal to the plurality of sub-pixels; a controller configured to convert a driving frequency of each of the data driver and the gate driver in a high frame rate mode; and a gamma voltage generator for generating gamma voltages respectively based on each driving frequency, wherein the controller is configured to generate a horizontal synchronization signal based on the driving frequency in the high frame rate mode. Accordingly, even when the driving frequency conversion occurs, image quality levels corresponding to various driving frequencies respectively may be kept uniform by applying the same operation duration to the various driving frequencies.

13 Claims, 6 Drawing Sheets

Related U.S. Application Data continuation of application No. 17/135,683, filed on Dec. 28, 2020, now Pat. No. 11,462,177.

(58) Field of Classification Search
CPC .. G09G 5/10; G09G 3/20; G09G 3/00; G09G 3/32; G09G 3/36; G09G 5/18; G09G 3/3266; G06F 3/041
See application file for complete search history.

(56) References Cited

U.S. PATENT DOCUMENTS

| | | | | |
|---|---|---|---|---|
| 9,940,886 | B2 | 4/2018 | Lee et al. | |
| 2002/0027540 | A1 | 3/2002 | Lee | |
| 2006/0001624 | A1 | 1/2006 | Lee | |
| 2007/0013785 | A1 | 1/2007 | Kinoshita et al. | |
| 2010/0201719 | A1* | 8/2010 | Kimura | G09G 5/005 345/698 |
| 2011/0025726 | A1 | 2/2011 | Tatsumi | |
| 2012/0056856 | A1 | 3/2012 | Woo et al. | |
| 2013/0021387 | A1 | 1/2013 | Takahashi et al. | |
| 2015/0103104 | A1 | 4/2015 | Lee et al. | |
| 2015/0124124 | A1 | 5/2015 | Maeyama | |
| 2015/0145758 | A1 | 5/2015 | Lee et al. | |
| 2015/0170609 | A1 | 6/2015 | Jung | |
| 2019/0088209 | A1* | 3/2019 | Kang | G09G 3/3233 |
| 2019/0122630 | A1 | 4/2019 | Kwon et al. | |
| 2019/0146620 | A1* | 5/2019 | Suyama | G06F 3/0412 345/174 |
| 2019/0180695 | A1* | 6/2019 | Ha | G09G 3/2051 |
| 2019/0253697 | A1 | 8/2019 | Kim et al. | |
| 2020/0013353 | A1 | 1/2020 | Saruhashi et al. | |
| 2020/0020277 | A1 | 1/2020 | Lee et al. | |
| 2020/0234669 | A1 | 7/2020 | Kuo et al. | |

FOREIGN PATENT DOCUMENTS

| | | | |
|---|---|---|---|
| CN | 105793915 | A | 7/2016 |
| JP | 2000-235375 | A | 8/2000 |
| KR | 10-2002-0018524 | A | 3/2002 |
| KR | 10-1263533 | B1 | 5/2013 |
| KR | 10-2015-0069357 | A | 6/2015 |

OTHER PUBLICATIONS

Korean Intellectual Property Office, Office Action, Korean Patent Application No. 10-2019-0179404, Jul. 29, 2023, 11 pages.
United States Office Action, U.S. Appl. No. 17/135,683, filed Nov. 12, 2021, 16 pages.
United States Office Action, U.S. Appl. No. 17/895,927, filed Dec. 23, 2022, 13 pages.
United States Office Action, U.S. Appl. No. 17/895,927, filed Jun. 22, 2023, nine pages.
China National Intellectual Property Administration, Office Action, Chinese Patent Application No. 202011606329.4, Jul. 10, 2024, 11 pages.

* cited by examiner

FIG. 6A

| | f1(60Hz) | f12(Ex. 75Hz) | f2(90Hz) | f23(Ex. 100Hz) | f3(120Hz) |
|---|---|---|---|---|---|
| GMA Set | α | | β | | γ |
| K | | (f12−f1) / (f2−f1) = 0.5 | | (f23−f2) / (f3−f2) = 0.33 | |
| IP GMA Set | α | β*0.5 | β | γ*0.33 | γ |

FIG. 6B

| | f1(60Hz) | f12(Ex. 75Hz) | f2(90Hz) | f23(Ex. 100Hz) | f3(120Hz) |
|---|---|---|---|---|---|
| GMA Set | α | | β | | γ |
| K | | i | | j | |
| IP GMA Set | α | β*i | β | γ*j | γ |

DISPLAY DEVICE

CROSS-REFERENCE TO RELATED APPLICATION

This application is a continuation of U.S. patent application Ser. No. 17/895,927 filed on Aug. 25, 2022, which is a continuation of U.S. patent application Ser. No. 17/135,683 filed on Dec. 28, 2020, which claims priority to and the benefit of Republic of Korea Patent Application No. 10-2019-0179404, filed on Dec. 31, 2019, each of which is hereby incorporated by reference in its entirety.

BACKGROUND

1. Technical Field

The present disclosure relates to a display device, and more particularly, to a display device that reduces luminance and color coordinate distortions during driving frequency conversion.

2. Description of the Related Art

An image display device that display various information using a screen is a key technology in an information communication era, and is developing toward a thinner, lighter, portable, and high-performance device. Accordingly, a display device capable of being manufactured in a thin and light form is attracting attention. Such a display device is embodied as a flat self-lighting-emitting device, which is not only advantageous in terms of power consumption based on low-voltage driving, but also has a high response speed, a high light-emitting efficiency, an excellent viewing angle, and an excellent contrast ratio and thus is being studied as a next-generation display. Such a display device implements an image using a plurality of sub-pixels arranged in a matrix form. Each of the plurality of sub-pixels includes a light-emitting element and a plurality of transistors that independently drive the light-emitting element.

Specific examples of a flat display device include a liquid crystal display device (LCD), a quantum dot display device (QD), a field emission display device (FED), an organic light-emitting display device (OLED), and the like. Among them, the organic light-emitting display device which does not require a separate light source and is in the spotlight as a device for compactness and clear color display has a high response speed, a high contrast ratio, a high luminous efficiency, a high luminance, and a wide viewing angle, due to using of an organic light-emitting diode (OLED).

A driving frequency may be automatically switched from SFR (Standard Frame Rate) to HFR (High Frame Rate) based on a type of an image such as a still image or a moving picture.

When driving the display device at the standard frame rate, a period of each of a vertical synchronization signal Vsync and a horizontal synchronization signal Hsync may be changed due to the switching of the driving frequency. For example, a period of each of the vertical synchronization signal and the horizontal synchronization signal at the high frame rate operating at 90 Hz may be shorter than a period of each of the vertical synchronization signal and the horizontal synchronization signal at the standard frame rate operating at 60 Hz.

As such, as the period of each of the vertical synchronization signal and the horizontal synchronization signal is changed, a duration of one horizontal period 1H may vary, such that an operation duration of a sub-pixel may vary. Therefore, even when the same gamma value is applied to the same RGB image data, luminance and color coordinates may be changed due to the switching of the driving frequency. In other words, in order to reduce defects due to luminance and color coordinates variation during the driving frequency conversion, separate optical compensations for luminance and color coordinate should be executed for the standard frame rate and the high frame rate respectively to compensate for the luminance and color coordinates variation. Thus, when performing separate optical compensations at the standard frame rate and the high frame rate respectively, a manufacturing process time of the display device is prolonged.

SUMMARY

A purpose of the present disclosure is to provide a display device configured to solve the above problem, in which a horizontal synchronization signal of the display device is generated based on a driving frequency in a high frame rate, and an intermediate frequency and an interpolated gamma voltage corresponding thereto are generated during driving frequency conversion, thereby suppress luminance and color coordinate distortions.

The purposes of the present disclosure are not limited to the above-mentioned purposes. Other purposes and advantages of the present disclosure, as not mentioned above, may be understood from the following descriptions, and more clearly understood from the embodiments of the present disclosure. Further, it will be readily appreciated that the objects and advantages of the present disclosure may be realized by features and combinations thereof as disclosed in the claims.

A display device according to an embodiment of the present disclosure includes a display panel having a plurality of sub-pixels to display an image; a data driver for supplying image data to the plurality of sub-pixels; a gate driver for supplying a gate signal to the plurality of sub-pixels; a controller configured to convert a driving frequency of each of the data driver and the gate driver in a high frame rate mode; and a gamma voltage generator for generating gamma voltages respectively based on each driving frequency, wherein the controller is configured to generate a horizontal synchronization signal based on the driving frequency in the high frame rate mode.

Further, a display device according to an embodiment of the present disclosure includes a frequency converter for generating an intermediate frequency between a first driving frequency and a second driving frequency when converting a driving frequency from the first driving frequency to the second driving frequency; and a gamma voltage generator for generating gamma voltages respectively based on each of the first and second driving frequencies and for storing therein gamma voltages respectively based on each of the first and second driving frequencies, wherein gamma voltages respectively based on each of the first driving frequency and the second driving frequency is stored as a pre-compensated value, wherein a gamma voltage corresponding to the intermediate frequency is a value interpolated between a first gamma voltage corresponding to the first driving frequency and a second gamma voltage corresponding to the second driving frequency.

According to the embodiments of the present disclosure, even when the driving frequency conversion occurs, image quality levels corresponding to various driving frequencies respectively may be kept uniform by applying the same operation duration to the various driving frequencies.

Further, optical compensation is performed for some of various driving frequencies, the manufacturing process time of the device may be shortened, to improve the process efficiency.

Further specific effects of the present disclosure as well as the effects as described above will be described in conduction with illustrations of specific details for carrying out the present disclosure.

BRIEF DESCRIPTION OF THE DRAWINGS

FIGS. 6A to 6B are diagrams of an operation of a gamma voltage interpolator in a display device according to an embodiment of the present disclosure.

DETAILED DESCRIPTION

Figure 1:
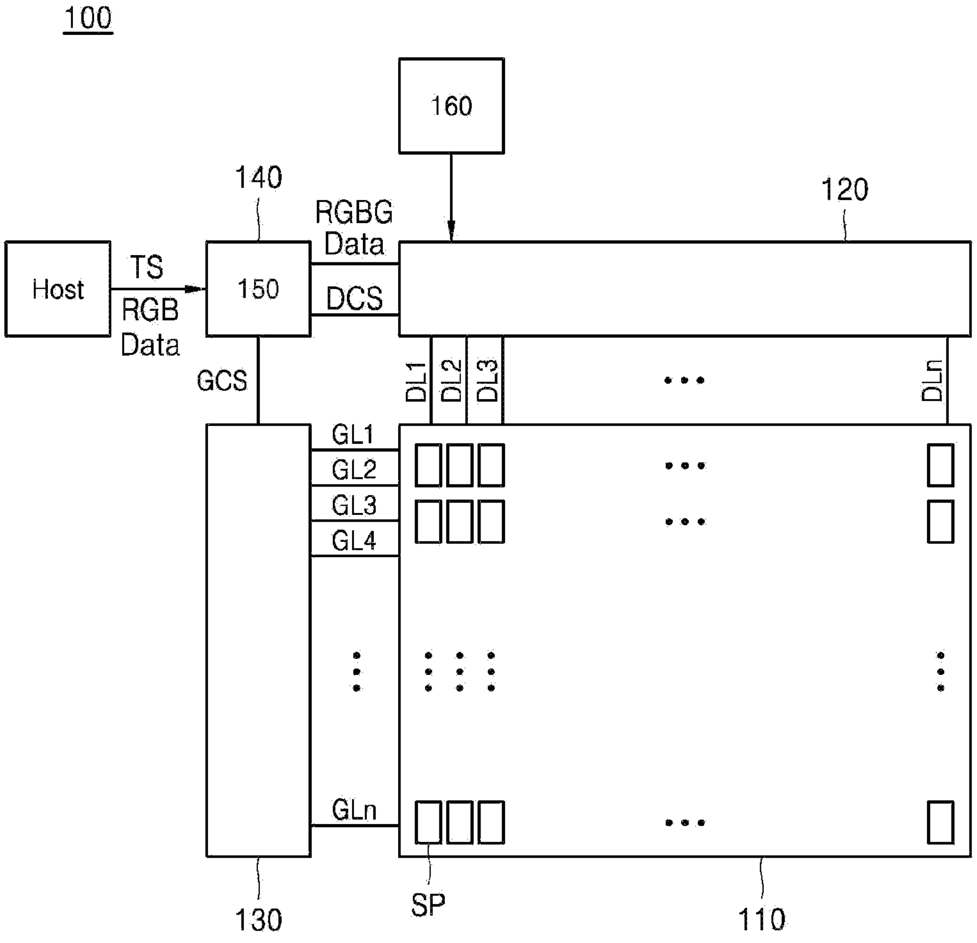
FIG. 1 is a system configuration diagram of a display device according to embodiments of the present disclosure.

For simplicity and clarity of illustration, elements in the figures are not necessarily drawn to scale. The same reference numbers in different figures represent the same or similar elements, and as such perform similar functionality. Shapes, sizes, scales, angles, numbers, etc. as disclosed in the drawings to illustrate an example of the present disclosure are exemplary and are not limited to the details shown in the present disclosure.

Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element is referred to as being present "on" or "beneath" a second element, the first element may be disposed directly on or beneath the second element or may be disposed indirectly on or beneath the second element with a third element being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In interpreting a numerical value in the disclosure, an error range may be inherent even when there is no separate explicit description thereof.

In descriptions of a temporal relationship, when for example, "after", "thereafter", "subsequently", "before", etc. is used, and when "right" or "directly" or "immediately" is not used, another event may occur between temporally adjacent events.

Features of various examples of the present disclosure may be partially or wholly combined with each other and may be associated with each other functionally. Various examples of the present disclosure may be implemented alone or in combination with each other.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a system configuration diagram of a display device according to embodiments of the present disclosure.

Referring to FIG. 1, a display device 100 according to embodiments of the present disclosure includes a display panel 110 including a plurality of data lines DL1 to DLm, a plurality of gate lines GL1 to GLn, a plurality of sub-pixels SP, a data driver 120 connected to a top or a bottom of the display panel 110 and driving the plurality of data lines DL1 to DLm, a gate driver 130 for driving the plurality of gate lines GL1 to GLn, a controller 140 for controlling the data driver 120 and the gate driver 130, a frequency converter 150 for generating a driving frequency conversion signal Sf using a timing signal TS received from the controller 140, and a gamma voltage generator 160 for generating a gamma voltage based on the driving frequency conversion signal Sf and supplying the same to the data driver 120.

Referring to FIG. 1, the plurality of sub-pixel SPs are arranged in a matrix type and on the display panel 110.

Therefore, a plurality of sub-pixel lines exists in the display panel 110. The sub-pixel line may act as a sub-pixel row or a sub-pixel column. Hereinafter, the sub-pixel line is referred to as a sub-pixel row.

The data driver 120 drives the plurality of data lines DL1 to DLm by supplying a data voltage to the plurality of data lines DL1 to DLn. In the connection, the data driver 120 is referred to as a source driver. The gate driver 130 sequentially drives the plurality of gate lines GL1 to GLn by sequentially supplying a scan signal to the plurality of gate lines GL1 to GLn. In the connection, gate driver 130 is referred to as a scan driver.

The controller 140 supplies various control signals to the data driver 120 and the gate driver 130 to control the data driver 120 and the gate driver 130.

The controller 140 starts scanning based on a timing implemented in each frame and converts RGB image data RGB Data input externally to a data signal format to be suitable for being used in the data driver 120 and outputs the converted RGBG image data RGBG Data and controls an data related operation at a suitable timing for the scan.

The gate driver 130 sequentially drives the plurality of gate lines GL1 to GLn by sequentially supplying a scan signal to the plurality of gate lines GL1 to GLn under control of the controller 140.

The gate driver 130 may be located on only one side to the display panel 110, as shown in FIG. 1, or may be located on both sides to the display panel 110, depending on a driving scheme or a panel design scheme. Further, the gate driver 130 may include at least one gate driver integrated circuit GDIC.

The data driver 120 may convert the RGB image data RGB Data received from the controller 140 to a data voltage in an analog form when a specific gate line is on and supply the data voltage to the plurality of data lines DL1 to DLm, thereby to drive the plurality of data lines DL1 to DLm.

The data driver 120 may include at least one source driver integrated circuit SDIC to drive the plurality of data lines.

Each of the aforementioned gate driver integrated circuit and the aforementioned source driver integrated circuit may be connected to a bonding pad of the display panel 110 in a tape automated bonding (TAB) manner or a chip on glass (COG) manner, or may be directly disposed on the display panel 110, or may be integrated into the display panel 110.

Each source driver integrated circuit may include a logic unit including a shift register, a latch circuit, etc., a digital analog converter (DAC), an output buffer, etc. In some cases, the source driver integrated circuit may further include a sensing controller for sensing characteristics of a sub-pixel to compensate for the characteristics of the sub-pixel (e.g., a threshold voltage Vth of a transistor, a threshold voltage Vth of an organic light-emitting diode, an luminance of the sub-pixel, etc.).

Further, each source driver integrated circuit may be implemented in a chip on film (COF) manner. In this case, one end of each source driver integrated circuit is bonded to at least one source printed circuit board, while the other end thereof is bonded to the display panel 110.

In one example, controller 140 may receive, from an external component (e.g., host system), various timing signals TS including a vertical synchronization signal Vsync, a horizontal synchronization signal Hsync, an input data enable (DE) signal, a clock signal (CLK), etc. together with the RGB image data RGB Data.

As described above, the controller 140 converts RGB image data RGB Data input externally to a data signal format to be suitable for being used in the data driver 120 and outputs the converted RGBG image data RGBG Data. Further, to control the data driver 120 and the gate driver 130, the controller 140 may receive the timing signals TS such as the vertical synchronization signal Vsync, the horizontal synchronization signal Hsync, the input DE signal, the clock signal CLK, and generate various control signals and output the control signals to the data driver 120 and the gate driver 130.

For example, for controlling the gate driver 130, the controller 140 may output various gate control signals GCS including a gate start pulse GSP, a gate shift clock GSC, a gate output enable signal GOE, etc. to the gate driver 130.

In the connection, the gate start pulse GSP controls an operation start timing of at least one gate driver integrated circuit constituting the gate driver 130. The gate shift clock GSC is a clock signal commonly input to at least one gate driver integrated circuit, and controls a shift timing of the scan signal (gate pulse). The gate output enable signal GOE specifies timing information of at least one gate driver integrated circuit.

Further, in order to control the data driver 120, the controller 140 may output various data control signals DCS including a source start pulse SSP, a source sampling clock SSC, a source output enable signal SOE, etc. to the data driver 120.

In the connection, the source start pulse SSP controls a data sampling start timing of at least one source driver integrated circuit constituting the data driver 120. The source sampling clock SSC is a clock signal that controls a sampling timing of data in each source driver integrated circuit. The source output enable signal SOE controls an output timing of the data driver 120.

The controller 140 may disposed on a control printed circuit board that is connected via a source printed circuit board onto which at least one source driver integrated circuit is bonded, via a flexible flat cable (FFC) or a flexible printed cable (FPC).

Further, the controller 140 may be separately formed from the substrate and may be disposed outside the substrate as illustrated above, or may be formed integrally with the data driver 120. In this connection, the data driver 120 may be implemented as the source driver integrated circuit formed in a chip on film (COF) manner, or in a chip on glass (COG) manner on the substrate.

The frequency converter 150 may control operation signals to be applied to the gate driver 130 based on a driving frequency conversion signal Sf received from the controller 140. The frequency converter 150 may be disposed in the controller 140. However, the present disclosure is not limited thereto. The frequency converter 150 may be disposed separately from the controller 140, depending on a design.

The gamma voltage generator 160 may supply a gamma voltage corresponding to a driving frequency to the data driver 120 based on the driving frequency conversion signal Sf. The gamma voltage generator 160 is illustrated to be disposed separately from the data driver 120 for convenience of illustration. However, the present disclosure is not limited thereto. The gamma voltage generator 160 may be disposed inside the data driver 120 depending on a design.

The display device 100 according to embodiments of the present disclosure is embodied as an organic light-emitting display device. Each sub-pixel SP thereof includes an organic light-emitting diode OLED and a circuit element such as a transistor TFT to drive the diode. A type and number of circuit elements constituting each sub-pixel SP may be variously determined based on a provided function and a design choice.

Figure 2:
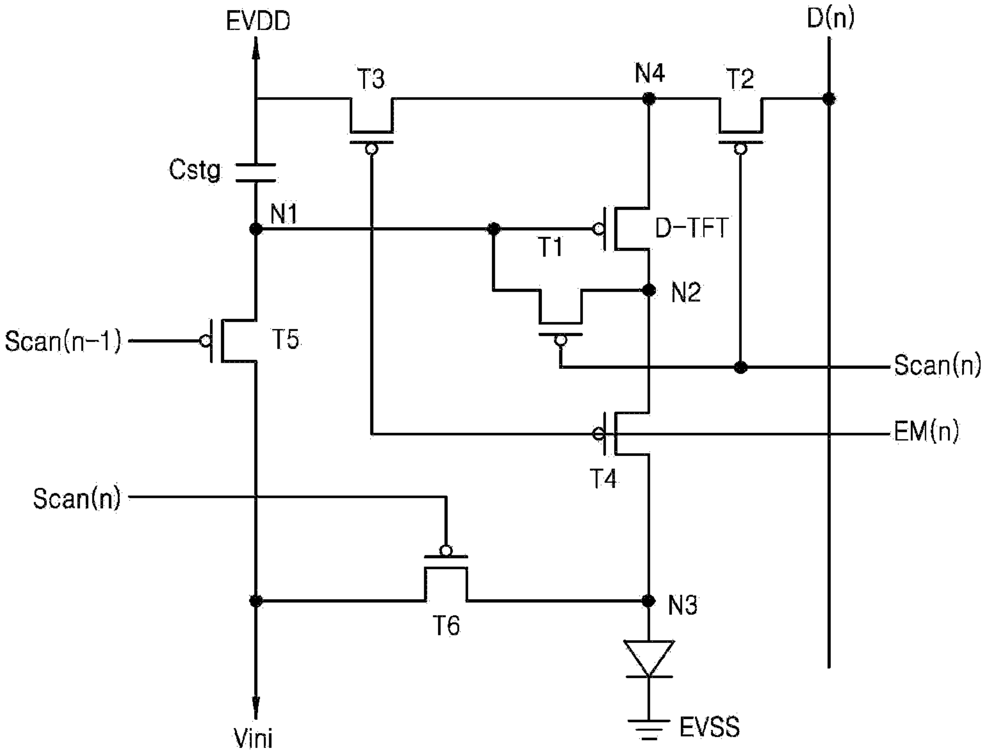
FIG. 2 is a diagram of a pixel circuit of a sub-pixel in a display device according to an embodiment of the present disclosure.

FIG. 2 is a diagram of a pixel circuit of a sub-pixel in a display device according to an embodiment of the present disclosure.

Referring to FIG. 2, each of sub-pixels SP arranged in an n-th row (n is a natural number) may include a light-emitting element EL, a driving transistor D-TFT, a first transistor T1, a second transistor T2, a third transistor T3, a fourth transistor T4, a fifth transistor T5, a sixth transistor T6, and a capacitor Cstg. Each of the first to sixth transistors may act as a switching transistor.

The light-emitting element EL emits light using driving current supplied from the driving transistor D-TFT. A multilayer-based organic compound stack may be formed between an anode electrode and a cathode electrode of the light-emitting element EL. The organic compound stack may include at least one hole transfer layer, at least one electron transfer layer, and a light-emitting layer EML. In the connection, the hole transfer layer acts as a layer that injects holes or transmits holes to the light-emitting layer. For example, the hole transfer layer may include a hole injection layer HIL, a hole transport layer HTL, and electron blocking layer EBL, and the like. The electron transfer layer acts as a layer that injects electrons or transmits electrons to the light-emitting layer. For example, the electron transfer layer may include an electron transport layer ETL, an electron injection layer EIL, and a hole blocking layer HBL Etc. The anode electrode of the light-emitting element EL may be connected to a third node N3. The cathode electrode of the organic light emitting element may be connected to an input of a low-level driving voltage EVSS.

The driving transistor DT may control the driving current to be applied to the light-emitting element EL based on a source-gate voltage Vsg thereof. The gate electrode of the driving transistor D-TFT may be connected to a first node N1, the source electrode thereof may be connected to a fourth node N4, and the drain electrode thereof may be connected to a second node N2.

The first transistor T1 may be connected to and disposed between the first node N1 and the second node N2, and may be turned on/off based on a n-th scan signal SCAN(n). The gate electrode of the first transistor T1 may be connected to an n-th scan line to which the n-th scan signal SCAN(n) is applied. The source electrode of the first transistor T1 may be connected to the first node N1. The drain electrode of the first transistor T1 may be connected to the second node N2. In the connection, the first transistor T1 may be referred to as a sampling transistor.

The second transistor T2 may be connected to and disposed between a data line D(n) and the fourth node N4, and may be turned on/off based on the n-th scan signal SCAN(n). The gate electrode of the second transistor T2 may be connected to the n-th scan line to which the n-th scan signal SCAN(n) is applied. The source electrode of the second transistor T2 may be connected to the data line D(n). The drain electrode of the second transistor T2 may be connected to the fourth node N4.

The third transistor T3 may be connected to and disposed between fourth node N4 and an input of a high-level driving voltage EVDD, and may be turned on/off based on an n-th emission control signal EM(n). The gate electrode of the third transistor T3 may be connected to an n-th emission line to which the n-th emission control signal EM(n) is applied. The source electrode of the third transistor T3 may be connected to an input of the high-level driving voltage EVDD. The drain electrode of the third transistor T3 may be connected to the fourth node N4.

The fourth transistor T4 may be connected to and disposed between the second node N2 and the third node N3 and may be turned on/off based on the n-th emission control signal EM(n). The gate electrode of the fourth transistor T4 may be connected to the n-th emission line to which the n-th emission control signal EM(n) is applied. The source electrode of the fourth transistor T4 may be connected to the second node N2. The drain electrode of the fourth transistor T4 may be connected to the third node N3. In the connection, the fourth transistor T4 may be referred to as an emission transistor.

The fifth transistor T5 may be connected to and disposed between the first node N1 and an input of an initialization voltage Vini, and may be turned on/off based on an (n−1)-th scan signal SCAN(n−1). The gate electrode of the fifth transistor T5 may be connected to an (n−1)-th scan line to which the (n−1)-th scan signal SCAN(n−1) is applied. The source electrode of the fifth transistor T5 may be connected to the first node N1. The drain electrode of the fifth transistor T5 may be connected to an input of the initialization voltage Vini. In the connection, the fifth transistor T5 may be referred to as a first initial transistor.

The sixth transistor T6 may be connected to and disposed between an input of the initialization voltage Vini and the third node N3, and may be turned on/off based on the n-th scan signal SCAN(n). The gate electrode of the sixth transistor T6 may be connected to the n-th scan line to which the n-th scan signal SCAN(n) is applied. The source electrode of the sixth transistor T6 may be connected to the third node N3. The drain electrode of the sixth transistor T6 may be connected to an input of the initialization voltage Vini. In the connection, the sixth transistor T6 may be referred to as a second initial transistor.

Further, the capacitor Cstg may be connected to and disposed between the first node N1 and the input of the voltage EVDD.

In the display device according to the embodiment of the present disclosure, each sub-pixel SP may include the light-emitting element EL, the driving transistor D-TFT, the first to sixth switching transistors, and the capacitor Cstg. However, the present disclosure is not limited thereto. A configuration of the sub-pixel SP may be freely modified depending on a design.

Figure 3A:
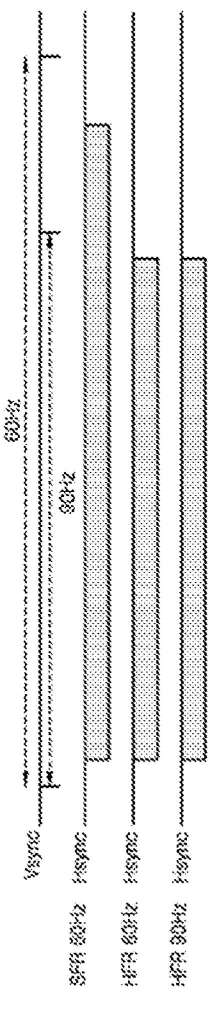
FIGS. 3A-3C are waveform diagrams of each driving frequency in a display device according to an embodiment of the present disclosure.
Figure 3B:
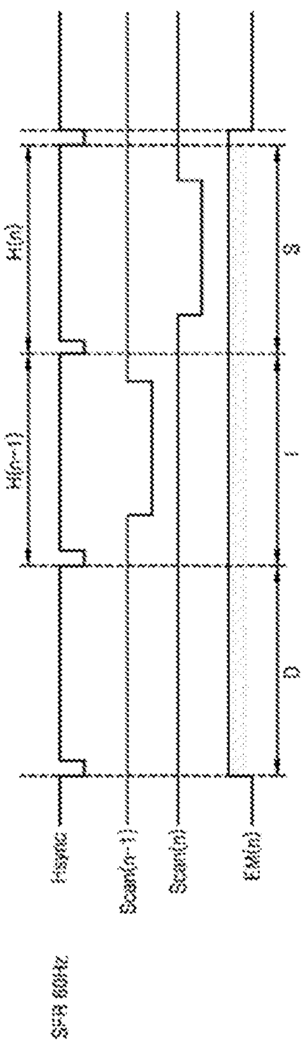
Figure 3C:
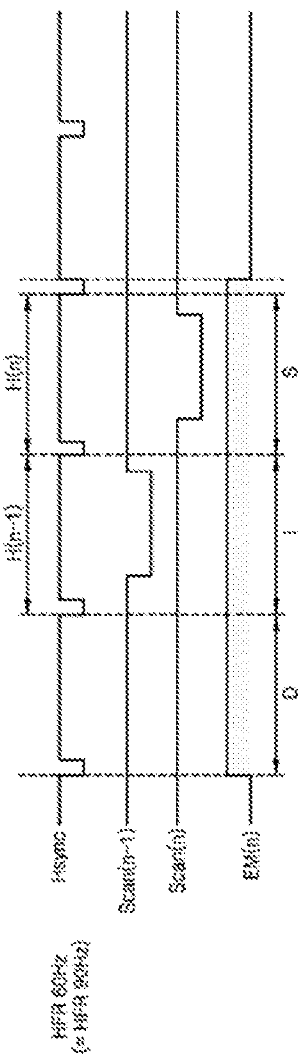

FIGS. 3A, 3B, and 3C are waveform diagrams of each driving frequency in a display device according to an embodiment of the present disclosure.

FIG. 3A is a waveform diagram of a vertical synchronization signal Vsync and a horizontal synchronization signal Hsync in each of a SFR mode and a HFR mode. FIG. 3B is a waveform diagram of a horizontal synchronization signal Hsync and a light-emitting operation at a standard frame rate (SFR) mode. FIG. 3C is a waveform diagram of a horizontal synchronization signal Hsync and a light-emitting operation at a high frame rate (HFR) mode.

Referring to FIG. 3A, the horizontal synchronization signal Hsync is generated in accordance with the vertical synchronization signal Vsync. In the standard frame rate (SFR) mode, the vertical synchronization signal Vsync and the horizontal synchronization signal Hsync are generated based on a corresponding driving frequency. Thus, the vertical synchronization signal Vsync and the horizontal synchronization signals Hsync may vary when the driving frequency varies. For example, when a 60 Hz driving frequency is switched to a 90 Hz driving frequency, a period of each of the vertical synchronization signal Vsync and the horizontal synchronization signal Hsync may vary. Thus, a duration of a single horizontal period 1H may vary. Thus, an operation duration of each sub-pixel SP may vary.

On the other hand, in the high frame rate (HFR) mode, the horizontal synchronization signal Hsync may be generated according to the high frame rate (HFR) of 90 Hz. Therefore, when driving the display device at a driving frequency of 60 Hz, a period of the vertical synchronization signal Vsync is different from that when driving the device at the driving frequency of 90 Hz. However, the horizontal synchronization signal Hsync may be kept the same. In this connection, a duration after the horizontal synchronization signal Hsync generated in accordance with the high frame rate (HFR) is terminated, within one period of the vertical synchronization signal Vsync, may be a holding duration for which a last frame is held or a blank duration for which an image is not displayed.

Referring to FIG. 3B to FIG. 3C, an operation duration of the sub-pixel SP includes an initialization duration I, a sampling duration S, and a light-emitting duration E. The operation durations may be defined based on the (n−1)-th and n-th scan signals SCAN(n−1), SCAN(n) and the n-th light-emitting control signal EM(n) applied to the sub-pixel SP. Each of the transistors that constitute the sub-pixel SP is embodied as a PMOS transistor. Thus, a low level is an on level, and a high level is an off level. Hereinafter, in order to facilitate the description, a low level is defined as an on level and a high level is defined as an off level.

The initialization duration I is included in an (n−1)-th horizontal period H(n−1) allocated for writing data to an (n−1)-th pixel row. For the initialization duration I, the (n−1)-th scan signal SCAN(n−1) may be applied at an on level, and each of the n-th scan signal SCAN(n) and the n-th light-emitting control signal EM(n) may be applied at an off level. The sampling duration S is included in the n-th horizontal period H(n) allocated for writing data to an n-th pixel row. For the sampling duration S, the n-th scan signal SCAN(n) may be applied at an on level, each of the (n−1)-th scan signal SCAN(n−1) and the n-th light-emitting control signal EM(n) may be applied at an off level. The light-emitting duration E may correspond to a remaining duration excluding the initialization duration I and the sampling duration S from one frame period. For the light-emitting duration E, the n-th light-emitting control signal EM(n) may be applied at an on level, and each of the (n−1)-th scan signal SCAN(n−1) and the n-th scan signal SCAN(n) may be applied at an off level.

A period of the horizontal synchronization signal Hsync generated based on the standard frame rate SFR and a period of the horizontal synchronization signal Hsync generated based on the high frame rate HFR are different from each other. When the horizontal synchronization signal Hsync is generated based on the high frame rate HFR, and then is applied to each of all of the driving frequencies, all of signal operations thereof may be performed in accordance with the generated same horizontal synchronization signal Hsync. Accordingly, even when the driving frequency varies, the same operation duration may be applied. For example, when the horizontal synchronization signal Hsync is generated based on a driving frequency of 90 Hz, and is applied to a driving frequency of 60 Hz, the device may operate in accordance with the same generated horizontal synchronization signal Hsync at the driving frequency of 60 Hz. Further, when the horizontal synchronization signal Hsync is generated based on a frequency of 120 Hz, and is applied to driving frequencies of 60 Hz and 90 Hz, the device may operate in accordance with the same generated horizontal synchronization signal Hsync at driving frequencies of 90 Hz and 60 Hz.

In other words, applying the same operation duration to all of driving frequencies may allow the image quality levels at the various driving frequencies to be uniform even when the driving frequency is switched between the various driving frequencies.

In one example, a dummy duration D may be further included between the initialization duration I and the light-emitting duration E. For the dummy duration D, the n-th scan signal SCAN(n) may be applied at an off level, and each of the (n−1)-th scan signal SCAN(n−1) and the n light-emitting control signal EM(n) may be applied at an off level. For the dummy duration D, the n-th light-emitting control signal EM(n) is not applied at an on level but is kept at an off level for a certain duration, while the n-th scan signal SCAN(n) is applied at an off level. Accordingly, noise due to current variation or voltage variation that may occur when the n-th scan signal SCAN(n) and the n-th light-emitting control signal EM(n) are synchronized with each other may be prevented.

Figure 4:
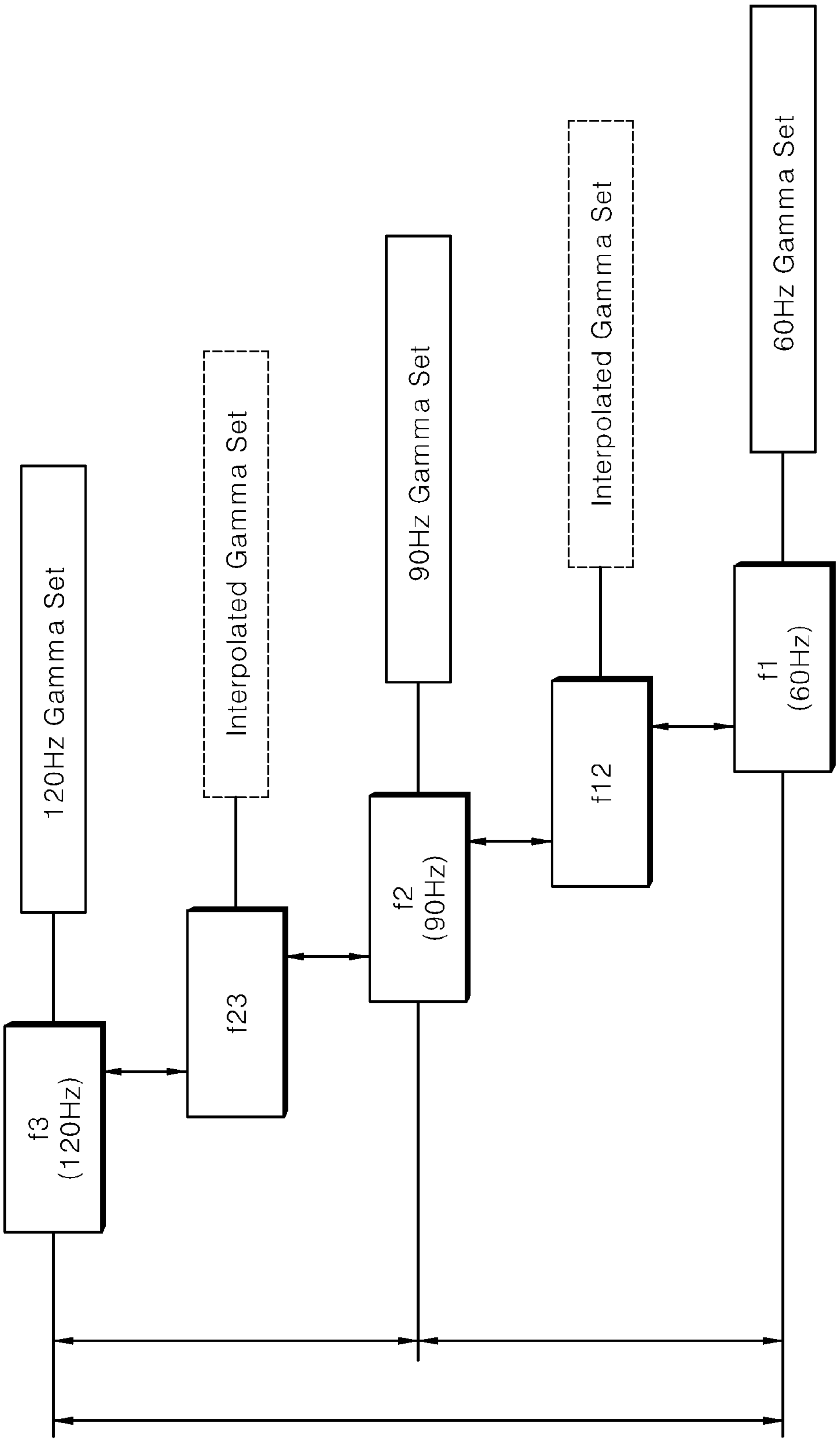
FIG. 4 is a diagram of a driving frequency conversion operation in a display device according to an embodiment of the present disclosure.

FIG. 4 is a diagram of a driving frequency conversion operation in a display device according to an embodiment of the present disclosure.

Referring to FIG. 4, when performing driving frequency conversion, the display device 100 may have a transition duration for which a plurality of intermediate frequencies are generated and applied for smooth image conversion.

In other words, it may be assumed that the driving frequencies of 60 Hz, 90 Hz, and 120 Hz are respectively referred to as a first driving frequency f1, a second driving frequency f2, and a third driving frequency f3. Frame switching is rapidly accelerated when the first driving frequency f1 is changed to the second driving frequency f2. Thus, change between images displayed on the display panel 110 is not smooth. Thus, noise, etc. may be observed. For this reason, a first intermediate frequency f12 greater than first driving frequency f1 and smaller than the second driving frequency f2 or a second intermediate frequency f23 greater than second driving frequency f2 and smaller than third driving frequency f3 may be generated.

For example, when the first driving frequency f1 of 60 Hz is converted to the second driving frequency f2 of 90 Hz, the first intermediate frequency f12 of 75 Hz is generated and used to prevent sudden variation between the driving frequencies. Further, when the second driving frequency f2 of 90 Hz is converted to the third driving frequency f3 of 120 Hz, the second intermediate frequency f23 of 105 Hz may be generated and used. Conversely, in conversion from the third driving frequency f3 to the second driving frequency f2 or conversion from the second driving frequency f2 to the first driving frequency f1, the first or second intermediate frequency f12 or f23 may be generated and applied.

In this connection, optical compensation may be applied to the first to third driving frequencies f1, f2, and f3 of 60 Hz, 90 Hz, and 120 Hz respectively during a manufacturing process of the device. Therefore, first to third gamma voltages corresponding to the first to third driving frequencies f1, f2, and f3 respectively may be stored in a gamma voltage generator (160 in FIG. 5). Thus, the device may operate based on the first to third gamma voltages at the first to third driving frequencies f1, f2, and f3, respectively. However, gamma voltages corresponding to the first and second intermediate frequencies f12 and f23 between the first to third driving frequencies f1, f2, and f3 may employ first and second values interpolated between the first to third gamma voltages corresponding to the first to third driving frequencies f1, f2, and f3, respectively. Then, the interpolated first and second values may be applied at the first and second intermediate frequencies f12 and f23, respectively. A scheme for generating the interpolated gamma voltage corresponding to the intermediate frequency will be described later.

Figure 5:
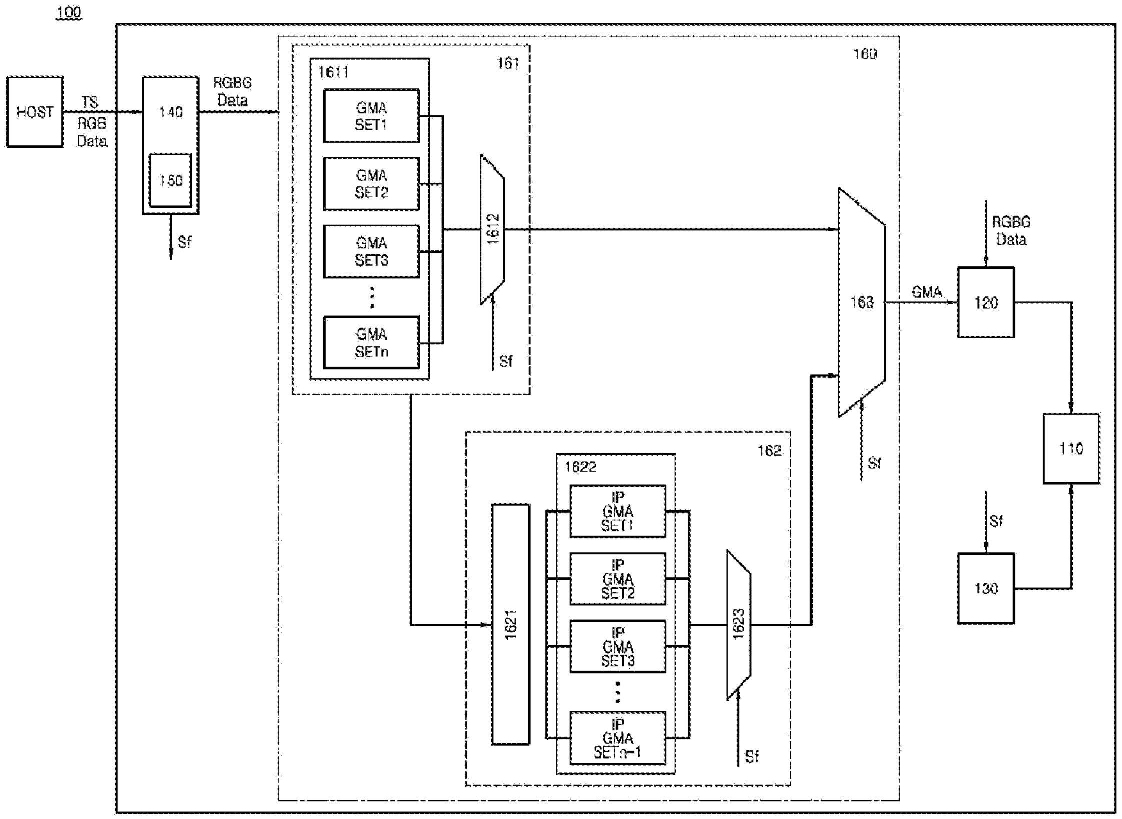
FIG. 5 is a block diagram of an operation of each functional block in a display device according to an embodiment of the present disclosure.

FIG. 5 is a block diagram of an operation of each functional block in a display device according to an embodiment of the present disclosure.

Referring to FIG. 5, the controller 140 receives, from an external host system, various timing signals TS such as the vertical synchronization signal Vsync and the horizontal synchronization signal Hsync together with the RGB image data RGB Data.

The controller 140 converts the RGB image data RGB Data into RGBG image data RGBG Data as a data signal format suitable for use in the data driver 120 and outputs the RGBG image data, and controls data driving at a suitable timing for the scan. In this connection, the RGBG image data RGBG Data may be of a data signal format for a pentile pixel structure. However, the present disclosure is not limited thereto. The RGBG image data RGBG Data may have various data signal formats depending on a design. Further, the controller 140 may vary the driving frequency based on the received RGB image data RGB Data and the timing signal TS.

The frequency converter 150 may generate the driving frequency conversion signal Sf using the timing signal TS received from controller 140, and then may control the operation signal to be applied to the gate driver 130 using the driving frequency conversion signal Sf. The frequency converter 150 may be disposed in the controller 140. However, the present disclosure is not limited thereto. The frequency converter 150 may be disposed separately therefrom depending on a design.

When generating the horizontal synchronization signal Hsync based on the standard frame rate (SFR), all the operation signals to be applied to the gate driver 130 may vary based on the driving frequency conversion signal Sf. Further, when generating the horizontal synchronization signal Hsync based on the high frame rate (HFR), all the operation signals to be applied to the gate driver 130 may vary such that a certain duration in one period of the vertical synchronization signal Vsync is a holding duration or a blank duration.

The gamma voltage generator 160 may be configured to include a gamma voltage setter 161, an interpolated gamma voltage setter 162, and a gamma voltage selector 163. The gamma voltage generator 160 is illustrated to be configured separately from the data driver 120 for convenience of illustration. However, the present disclosure is not limited thereto. The gamma voltage generator 160 may be disposed inside the data driver 120 depending on a design.

The gamma voltage setter 161 may include a first memory 1611 and a first selector 1612. The first memory 1611 may store a gamma voltage set GMA Setn corresponding to each of driving frequencies, which are obtained via the optical compensation. The first selector 1612 may select one of the gamma voltage sets GMA Setn stored in the first memory 1611 based on the driving frequency conversion signal Sf and output the selected one to the gamma voltage selector 163.

The interpolated gamma voltage setter 162 may include a gamma voltage interpolator 1621, a second memory 1622, and a second selector 1623. The second memory 1622 may store an interpolated gamma voltage set IP GMA Setn−1 corresponding to each of intermediate frequencies between the driving frequencies, which are obtained via an interpolating method. The second selector 1623 may select one of the interpolated gamma voltage sets IP GMA Setn−1 stored in the second memory 1622 based on the driving frequency conversion signal Sf and output the selected one to the gamma voltage selector 163.

The gamma voltage selector 163 may select a gamma or interpolated gamma voltage suitable for a corresponding driving frequency from the gamma voltages from the gamma voltage setter 161 or the interpolated gamma voltages from the interpolated gamma voltage setter 162, based on the driving frequency conversion signal Sf, and may supply the selected gamma or interpolated gamma voltage to the data driver 120.

For example, during the manufacturing process of the display device 100, the gamma voltage setter 161 may apply the optical compensation to the first to third driving frequencies f1, f2, and f3 such as 60 Hz, 90 Hz, and 120 Hz and pre-store therein the gamma voltage set GMA Setn corresponding to each of driving frequencies, which are obtained via the optical compensation. When driving the display device, the gamma voltage setter 161 may select a gamma voltage set based on the corresponding driving frequency and may output the selected one.

In this connection, when the display device 100 is powered on, the interpolated gamma voltage setter 162 may generate the interpolated gamma voltage sets IP GMA Set1 and IP GMA Set2 corresponding to first and second intermediate frequencies f12 and f23 between the first to third driving frequencies f1, f2, and f3 with reference to each of the gamma voltage sets GMA Set1, GMA Set2, and GMA Set3 stored in the gamma voltage setter 161 and may pre-store the same therein. Therefore, even when the driving frequency varies during driving, the pre-stored interpolated gamma voltage sets IP GMA Set1 and IP GMA Set2 may be applied immediately, thereby to prevent operation delay.

A number of the driving frequencies to which the optical compensation is applied, and a number of the intermediate frequencies between adjacent driving frequencies may not be limited to the above example. A number of the driving frequencies to which the optical compensation is applied may be n, and a number of the intermediate frequencies between adjacent driving frequencies may be n−1.

Therefore, optical compensation is not required for all of the driving frequencies at each step of the driving frequency conversion. Thus, the process time may be shortened. In this way, efficient production of the device may be realized.

FIGS. 6A and 6B are diagrams of an operation of a gamma voltage interpolator in a display device according to an embodiment of the present disclosure.

FIG. 6A is a table for illustrating a scheme for calculating a compensation coefficient K using a proportional expression between the driving frequencies and generating the interpolated gamma voltage sets IP GMA Setn−1 using the compensation coefficient K. FIG. 6B is a table for illustrating a scheme for receiving the compensation coefficient K externally and directly and generating the interpolated gamma voltage sets IP GMA Setn−1 using the compensation coefficient K.

Referring to FIG. 6A, the gamma voltage compensation coefficient K of the intermediate frequency may be calculated based on a difference between frequencies of the driving frequency and the intermediate frequency and a difference between frequencies of adjacent driving frequencies. For example, the gamma voltage set GMA Setn corresponding to the first to third driving frequencies f1, f2, and f3 to which optical compensation has been applied are referred to as a, B, and y, respectively. In this connection, the compensation coefficient K of the first intermediate frequency f12 generated between the first driving frequency f1 and the second driving frequency f2 may be a value obtained by dividing a difference between the first driving frequency f1 and the first intermediate driving frequency f12 by a difference between the first driving frequency f1 and the second driving frequency f2. In other words, the compensation coefficient K of the first intermediate frequency f12 may be (f12−f1)/(f2−f1). The Compensation coefficient K of the second intermediate frequency f23 generated between the second driving frequency f2 and the third driving frequency f3 may be calculated in the same way.

The interpolated gamma voltage sets IP GMA Setn−1 corresponding to the first and second intermediate frequencies f12 and f23 may be derived by applying the calculated compensation coefficients K to the gamma voltage sets GMA Set corresponding to the first to third driving frequencies f1, f2, and f3.

Referring to FIG. 6B, the compensation coefficient K of the intermediate frequency may be set and input to the device by a user. The compensation coefficients K corresponding to the first and second intermediate frequencies f12 and f23 as input by the user may be as i and j, respectively. The interpolated gamma voltage sets IP GMA Setn−1 corresponding to the first and second intermediate frequencies f12 and f23 may be derived by applying i and j to the gamma voltage sets GMA Set corresponding to the first to third driving frequencies f1, f2, and f3.

The display device according to an embodiment of the present disclosure generates the intermediate frequency upon the driving frequency conversion. In this connection, the device may generate and apply the interpolated gamma voltage set corresponding to the intermediate frequency. This may prevent a sudden frequency conversion to enable smooth image conversion. Further, the optical compensation is applied to only some of all of driving frequencies, thereby shortening the manufacturing process of the device, thereby to improve the production process thereof.

A display device according to the present disclosure may include following aspects and implementations.

A first aspect of the present disclosure provides a display device comprising: a display panel having a plurality of sub-pixels to display an image; a data driver for supplying image data to the plurality of sub-pixels; a gate driver for supplying a gate signal to the plurality of sub-pixels; a controller configured to convert a driving frequency of each of the data driver and the gate driver in a high frame rate mode; and a gamma voltage generator for generating gamma voltages respectively based on each driving frequency, wherein the controller is configured to generate a horizontal synchronization signal based on the driving frequency in the high frame rate mode.

In one implementation of the first aspect, the driving frequency includes a first driving frequency and a second driving frequency higher than the first driving frequency, wherein each of the gate and data drivers is configured to operate at the first driving frequency using the horizontal synchronization signal generated based on the second driving frequency.

In one implementation of the first aspect, the controller includes a frequency converter, wherein the frequency converter is configured to generate a first intermediate frequency between the first driving frequency and the second driving frequency during the driving frequency conversion therebetween.

In one implementation of the first aspect, an gamma voltage corresponding to the first intermediate frequency is obtained by: dividing a difference between the first driving frequency and the first intermediate driving frequency by a difference between the first driving frequency and the second driving frequency to obtain a compensation coefficient; and applying the compensation coefficient to a gamma voltage corresponding to the second driving frequency to obtain an interpolated gamma voltage, wherein the interpolated gamma voltage is the gamma voltage corresponding to the first intermediate frequency.

In one implementation of the first aspect, the gamma voltage generator includes a gamma voltage setter, an interpolated gamma voltage setter, and a gamma voltage selector.

In one implementation of the first aspect, the gamma voltage setter includes a first memory and a first selector, wherein the first memory stores therein a plurality of gamma voltage sets corresponding to a plurality of driving frequencies, wherein the first selector selects and outputs one of the plurality of gamma voltage sets based on a driving frequency selection signal.

In one implementation of the first aspect, the interpolated gamma voltage setter includes a gamma voltage interpolator, a second memory, and a second selector, wherein the gamma voltage interpolator generates an interpolated gamma voltage set corresponding to the intermediate frequency using the plurality of gamma voltage sets stored in the gamma voltage setter.

In one implementation of the first aspect, each of the data driver and the gate driver is configured to operate at a plurality of driving frequencies based on the same horizontal synchronization signal.

In one implementation of the first aspect, the display panel has the same operation duration corresponding to the same horizontal synchronization signal at a plurality of driving frequencies.

In one implementation of the first aspect, an initialization voltage is equal to or lower than a low-level driving voltage.

A first aspect of the present disclosure provides a display device comprising: a frequency converter for generating a first intermediate frequency between a first driving frequency and a second driving frequency when converting a driving frequency from the first driving frequency to the second driving frequency; and a gamma voltage generator for generating gamma voltages respectively based on each of the first and second driving frequencies and for storing therein gamma voltages respectively based on each of the first and second driving frequencies, wherein gamma voltages respectively based on each of the first driving frequency and the second driving frequency is stored as a pre-compensated value, wherein a gamma voltage corresponding to the first intermediate frequency is a value interpolated between a first gamma voltage corresponding to the first driving frequency and a second gamma voltage corresponding to the second driving frequency.

In one implementation of the second aspect, the second driving frequency is higher than the first driving frequency, wherein each of the gate and data drivers is configured to operate at the first driving frequency using a horizontal synchronization signal generated based on the second driving frequency.

In one implementation of the second aspect, a sub-pixel has the same operation duration at the first and second driving frequencies.

In one implementation of the second aspect, an gamma voltage corresponding to the first intermediate frequency is obtained by: dividing a difference between the first driving frequency and the first intermediate driving frequency by a difference between the first driving frequency and the second driving frequency to obtain a compensation coefficient; and applying the compensation coefficient to a gamma voltage corresponding to the second driving frequency to obtain an interpolated gamma voltage, wherein the interpolated gamma voltage is the gamma voltage corresponding to the first intermediate frequency.

In one implementation of the second aspect, the compensation coefficient is not calculated based on the driving frequency, but is preset.

In one implementation of the second aspect, the gamma voltage generator includes a gamma voltage setter, an interpolated gamma voltage setter, and a gamma voltage selector.

In one implementation of the second aspect, the gamma voltage setter includes a first memory and a first selector, wherein the first memory stores therein a plurality of gamma voltage sets corresponding to a plurality of driving frequencies, wherein the first selector selects and outputs one of the plurality of gamma voltage sets based on a driving frequency selection signal.

In one implementation of the second aspect, the interpolated gamma voltage setter includes a gamma voltage interpolator, a second memory, and a second selector, wherein the gamma voltage interpolator generates an interpolated gamma voltage set corresponding to the intermediate frequency using the plurality of gamma voltage sets stored in the gamma voltage setter.

In one implementation of the second aspect, the gamma voltage selector is configured to: select and output a gamma voltage from the gamma voltage set from the gamma voltage setter based on a driving frequency conversion signal; and/or select and output an interpolated gamma voltage from the interpolated gamma voltage set from the interpolated gamma voltage setter.

In one implementation of the second aspect, the controller is configured to convert RGB image data received from an external host system to RGBG image data and then output the RGBG image data.

Features, structures, effects, etc. as described above in the present disclosure are included in at least one example of the present disclosure and are not necessarily limited to one example. Furthermore, the features, structures, effects, etc. exemplified in at least one example of the present disclosure may be applied to other examples by the skilled person to the art in a combined or modified manner. These combinations and modifications should be interpreted as being included in a scope of the present disclosure.

The present disclosure as illustrated above is not limited to the above-described embodiments and the accompanying drawings. It will be apparent to those skilled in the art to which the present disclosure belongs that various substitutions, modifications, and variations may be made thereto without departing from the scope of the present disclosure. Therefore, the scope of the present disclosure is indicated by the following claims. The meaning and scope of the claims and altered or modified forms derived from equivalent concepts thereto should be interpreted as being included in the scope of the present disclosure.

What is claimed is:

1. A display device comprising:

a display panel including a plurality of pixels;

a data driver configured to drive the display panel; and a gate driver configured to supply a scan signal and an emission control signal to the display panel, wherein the plurality of pixels includes:

a light-emitting element including an anode electrode, a cathode electrode, and a multilayer-based organic compound stack between the anode electrode and the cathode electrode;

a driving transistor configured to drive the light-emitting element; and a plurality of switching transistors configured to drive the driving transistor, wherein each of the plurality of pixels is driven by scan signals output from the same gate driver and a one emission control signal, wherein the plurality of switching transistors comprise:

a sampling transistor connected to a first node of the driving transistor and a second node of the driving transistor;

a second transistor connected to a data line and a fourth node of the driving transistor;

a third transistor connected to the fourth node of the driving transistor and an input of a high-level driving voltage;

an emission transistor connected to the second node of the driving transistor and a third node of the light-emitting element;

a first initial transistor connected to the first node of the driving transistor and an input of an initialization voltage;

a second initial transistor connected to the input of an initialization voltage and the third node of the light-emitting element; and a capacitor connected to the first node of the driving transistor and the input of the initialization voltage.

2. The display device of claim 1, wherein the display device is configured to be driven by a standard frame rate mode or a high frame rate mode.

3. The display device of claim 1, wherein a horizontal synchronization signal used in a standard frame rate mode is used in a high frame rate mode.

4. The display device of claim 1, wherein a duration of the scan signal or the emission control signal in a standard frame rate mode and a duration of the scan signal or the emission control signal are different from each other.

5. The display device of claim 1, wherein the data driver is configured to be driven by a first driving frequency, a second driving frequency and at least on of intermediate frequency.

6. The display device of claim 1, wherein:

the emission transistor is configured to be turned on/off based on the one emission control signal;

the first initial transistor is configured to be turned on/off based on a (n−1)-th scan signal; and the second initial transistor is configured to be turned on/off based on a n-th scan signal.

7. The display device of claim 1, wherein the driving transistor or the plurality of switching transistors are PMOS transistors.

8. The display device of claim 1, wherein the multilayer-based organic compound stack includes a hole transfer layer, an electron transfer layer, and a light-emitting layer, and wherein the hole transfer layer includes a hole injection layer, a hole transport layer, and an electron blocking layer, and wherein the electron transfer layer includes an electron transport layer, an electron injection layer, and a hole blocking layer.

9. The display device of claim 1, wherein a driving frequency of the data driver includes a first frequency and a second frequency, wherein when the first frequency is changed from the first frequency to the second frequency, the data driver operates at an intermediate frequency in at least some frames from a plurality of frames, and wherein image data is generated by interpolation at an intermediate frequency in the at least some frames.

10. The display device of claim 9, further comprising:

a voltage generator configured to generate a voltage corresponding to the driving frequency and an intermediate voltage corresponding to the intermediate frequency.

11. The display device of claim 10, wherein the voltage generator is configured to obtain the intermediate voltage by:

dividing a difference between the first frequency and a first intermediate driving frequency by a difference between the first frequency and the second frequency to obtain a compensation coefficient; and applying the compensation coefficient to a voltage corresponding to the second frequency to obtain an interpolated voltage, wherein the interpolated voltage is the intermediate voltage.

12. The display device of claim 10, wherein the intermediate voltage is selected from an intermediate voltage set, and wherein the voltage generator is configured to generate the intermediate voltage set based on a pre-stored voltage set corresponding to a first driving frequency and a second driving frequency.

13. The display device of claim 10, wherein the voltage generator is configured to generate the intermediate voltage based on a value interpolated between a first voltage corresponding to the first frequency and a second voltage corresponding to the second frequency.

* * * * *